US008054371B2

(12) United States Patent
Wang et al.

(10) Patent No.: US 8,054,371 B2
(45) Date of Patent: Nov. 8, 2011

(54) COLOR FILTER FOR IMAGE SENSOR

(75) Inventors: Ching-Chun Wang, Tainan (TW);
Dun-Nian Yaung, Taipei (TW);
Chien-Hsien Tseng, Hsinchu (TW);
Shou-Gwo Wuu, Hsin-Chu (TW)

(73) Assignee: Taiwan Semiconductor Manufacturing Company, Ltd., Hsin-Chu (TW)

(*) Notice: Subject to any disclaimer, the term of this patent is extended or adjusted under 35 U.S.C. 154(b) by 687 days.

(21) Appl. No.: 11/676,388

(22) Filed: Feb. 19, 2007

(65) Prior Publication Data
US 2008/0198454 A1  Aug. 21, 2008

(51) Int. Cl.
H04N 5/225 (2006.01)
H04N 5/335 (2011.01)
G02B 5/30 (2006.01)
H04L 31/062 (2006.01)

(52) U.S. Cl. ........ 348/342; 348/272; 348/273; 359/486; 257/290

(58) Field of Classification Search .................. 348/342, 348/273; 359/486
See application file for complete search history.

(56) References Cited

U.S. PATENT DOCUMENTS

| | | | |
|---|---|---|---|
| 5,336,879 A | 8/1994 | Sauer | |
| 5,525,828 A | 6/1996 | Bassous et al. | |
| 5,703,357 A | 12/1997 | Shih et al. | |
| 6,107,652 A | 8/2000 | Scavennec et al. | |
| 6,150,683 A | 11/2000 | Merrill et al. | |
| 6,362,513 B2 | 3/2002 | Wester | |
| 6,628,392 B2 * | 9/2003 | Kuroda et al. | 356/400 |
| 6,737,719 B1 | 5/2004 | Yamamoto | |
| 6,765,276 B2 * | 7/2004 | Fasen et al. | 257/437 |
| 6,815,787 B1 | 11/2004 | Yaung et al. | |
| 6,870,149 B2 | 3/2005 | Berezin | |
| 7,248,297 B2 * | 7/2007 | Catrysse et al. | 348/273 |
| 7,630,133 B2 * | 12/2009 | Perkins | 359/486 |
| 2003/0103150 A1 | 6/2003 | Catrysse et al. | |
| 2004/0042083 A1 * | 3/2004 | Turner, III | 359/578 |
| 2004/0080036 A1 | 4/2004 | Chang et al. | |
| 2004/0085796 A1 | 5/2004 | Tatsumi | |
| 2005/0121599 A1 | 6/2005 | Mouli | |
| 2006/0044429 A1 * | 3/2006 | Toda et al. | 348/272 |

(Continued)

FOREIGN PATENT DOCUMENTS

EP   1008870   6/2000

(Continued)

OTHER PUBLICATIONS

Peter B. Catrysse et al., "Integrated color pixels in 0.18-um complementary metal oxide semiconductor technology", 2003 Optical Society of America, vol. 20, No. 12/Dec. 2003, pp. 2293-2306.

(Continued)

Primary Examiner — David Ometz
Assistant Examiner — Quang Le
(74) Attorney, Agent, or Firm — Haynes and Boone, LLP

(57) ABSTRACT

An image sensor device includes a semiconductor substrate having a front surface and a back surface, pixels formed on the front surface of the semiconductor substrate, and grid arrays aligned with one of the pixels. One of the grid arrays is configured to allow a wavelength of light to pass through to the corresponding one of the pixels. The grid arrays are disposed overlying the front or back surface of the semiconductor substrate.

16 Claims, 7 Drawing Sheets

U.S. PATENT DOCUMENTS

| | | | |
|---|---|---|---|
| 2006/0097134 A1* | 5/2006 | Rhodes | 250/214.1 |
| 2006/0192083 A1* | 8/2006 | Fu et al. | 250/214.1 |
| 2007/0034777 A1* | 2/2007 | Tuckerman et al. | 250/208.1 |
| 2007/0257283 A1* | 11/2007 | Chyan et al. | 257/290 |

FOREIGN PATENT DOCUMENTS

| | | |
|---|---|---|
| JP | 101042169 | 2/1989 |
| TW | I255440 | 5/2006 |
| WO | WO2005092037 | 6/2005 |

OTHER PUBLICATIONS

L. Yang et al, "High Performance of Fe:InP/InGaAs Metal/Semiconductor/Metal Photodetectors Grown by Metalorganic Vapor Phase Epitaxy", IEEE Photonics Technology, vol. 2, No. 1, Jan. 1990, pp. 56-58.

Taiwanese Patent Office, Office Action issued Sep. 29, 2010, Application No. 095143350, 8 pages.

Schmidt, et al., "Color filtering metallization for optoelectronic 100nm CMOS circuits," Electron Devices Meeting, 2003 IEDM 2003 Technical Digest, IEEE International, Dec. 8-10, 2003, pp. 16.2.1-16.2.4.

Chen, et al., "Wavelength detector using a pair of metal-semiconductor-metal photodetectors with subwavelength finger spacings," Electronics Letters, Aug. 1, 1996, vol. 32, No. 16, 2 pages.

Singapore Written Opinion and Search Report issued Jul. 8, 2010 by the Intellectual Property Office of Singapore for Singapore Application No. 200605020 7, 17 pages.

\* cited by examiner

COLOR FILTER FOR IMAGE SENSOR

BACKGROUND

An image sensor provides a grid of pixels which may contain photosensitive diodes or photodiodes, reset transistors, source follower transistors, pinned layer photodiodes, and/or transfer transistors for recording intensity or brightness of light. The pixel responds to the light by accumulating photo-charges—the more light, the more the photo-charges. The charges can then be used by another circuit so that a color and brightness can be used for a suitable application, such as a digital camera. Common types of pixel grids include a charge-coupled device (CCD), a complimentary metal oxide semiconductor (CMOS) image sensor (CIS), an active-pixel sensor (APS), and a passive-pixel sensor.

In order to capture color information, image sensors employ a color filter layer that incorporates several different color filters (e.g., red, green, and blue), and are positioned such that the incident light is directed through the filter. This can be done by using organic-based color filter materials, such as polymer dye-based or pigment-based materials, to filter out specific frequency bands (colors). Either way, the cost of the color filters used in image sensors accounts for a large part of the total cost of the image sensor. Additionally, the color filter layer adds to the physical size of the device.

Therefore, improvements in color filter design and fabrication are desired to reduce the cost and size of image sensors.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
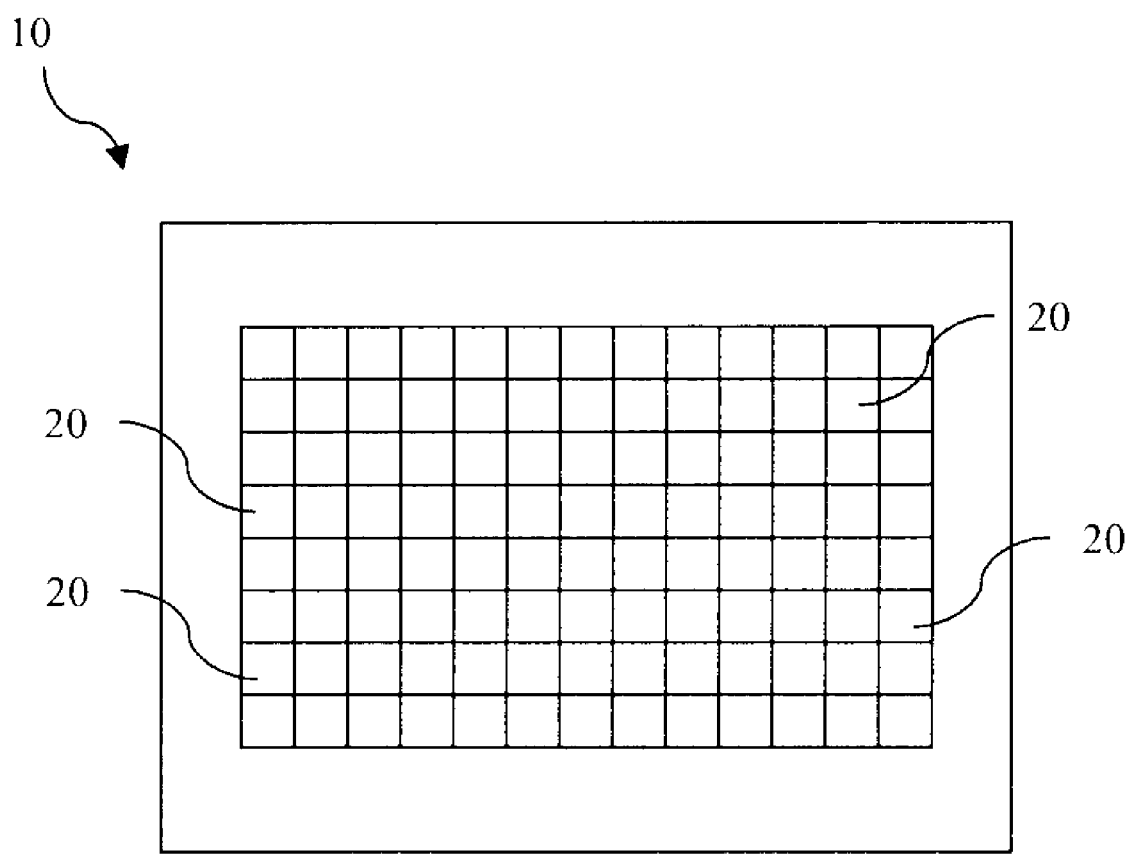
FIG. 1 is a top view of an image sensor including a plurality of pixels, according to one or more embodiments of the present disclosure.

It is to be understood that the following disclosure provides many different embodiments, or examples, for implementing different features of various embodiments. Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Referring to FIG. 1, illustrated is a top view of an image sensor 10 including a grid of pixels 20. Additional circuitry and input/outputs are typically provided adjacent to the grid of pixels 20 for providing an operation environment for the pixels and for supporting external communications with the pixels. The image sensor 10 may include a charge-coupled device (CCD), complimentary metal oxide semiconductor (CMOS) image sensor (CIS), an active-pixel sensor (APS), and a passive-pixel sensor.

Figure 2:
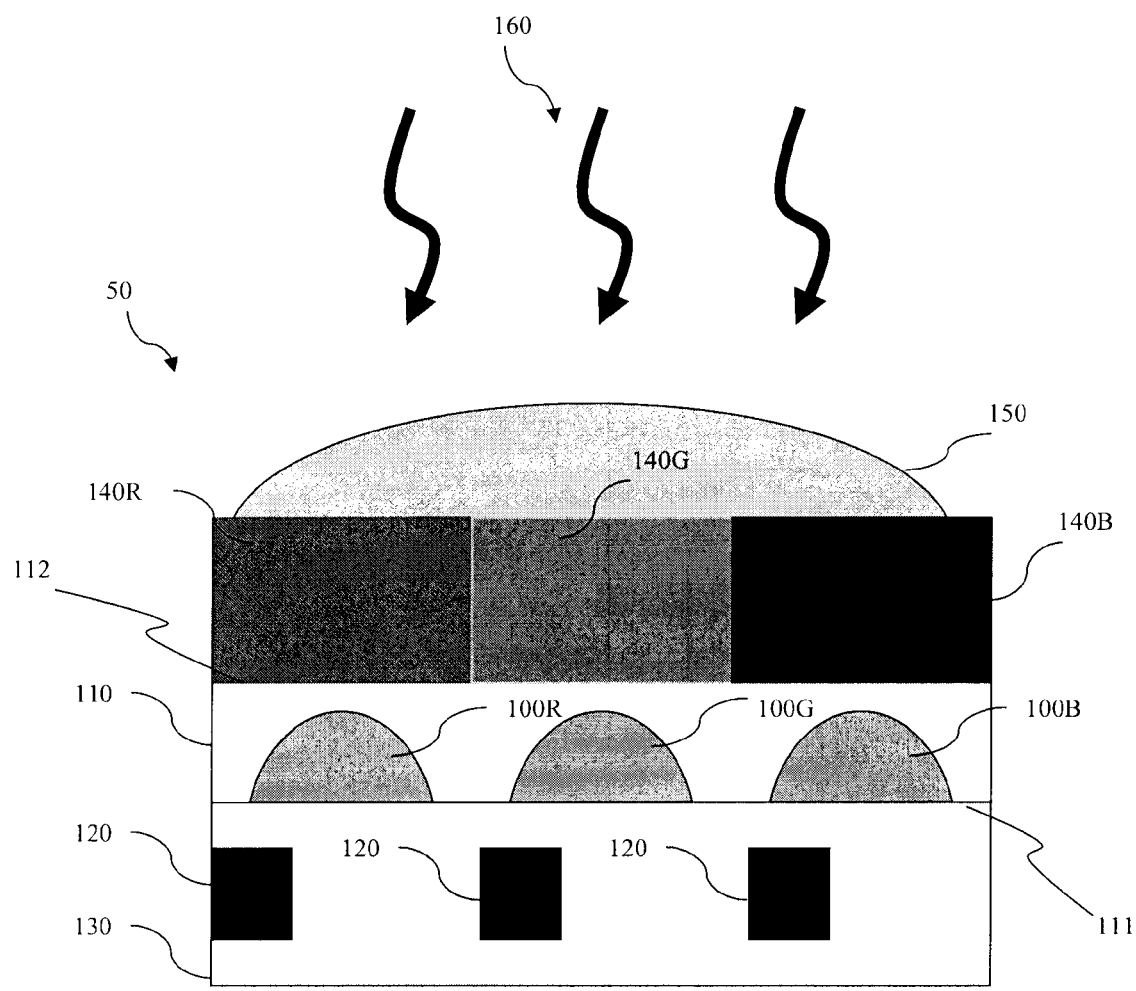
FIG. 2 is a cross-sectional view of a back-side illuminated image sensor including conventional color filters.

Referring to FIG. 2, illustrated is a cross-sectional view of a back-side illuminated image sensor 50 including a plurality of pixels 100. In the present example, the plurality of pixels 100 include a first pixel 100R for receiving red light (red pixel), a second pixel 100G for receiving green light (green pixel), and a third pixel 100B for receiving blue light (blue pixel). It is understood that the use of visible light (e.g., red, green, and blue light) is a mere example and that other types of radiation such as infrared (IR), microwave, X-ray, and ultraviolet (UV) may be used in other types of applications. The pixels 100R, 100G, 100B may be formed on a semiconductor substrate 110. The substrate 110 may include a front surface 111 and a back surface 112. The substrate 110 may comprise an elementary semiconductor such as silicon, germanium, and diamond. Alternatively, the substrate 110 may also comprise a compound semiconductor such as silicon carbide, gallium arsenic, indium arsenide, and indium phosphide. Additionally, semiconductor substrate types such as silicon-on-insulator (SOI) and/or an epitaxial layer may be utilized.

The pixels 100R, 100G, 100B may each comprise of a photodiode and at least one transistor for sensing and recording an intensity of light. An example of a photodiode that can be used in this embodiment is shown in U.S. patent application Ser. No. 11/291,880, filed on Dec. 1, 2005, which is hereby incorporated by reference. For example, the substrate 110 may comprises a P-type silicon. A silicon epitaxial layer (epilayer) may be grown on the substrate 110 by a method such as chemical vapor deposition (CVD). The epilayer may have a lower concentration of dopant than that of the heavily doped P-type silicon substrate 110. The photodiode includes a light-sensing region which in the present embodiment is an N-type doped region having dopants formed in the silicon epilayer. All doping may be implemented using a process such as ion implantation or diffusion in various steps and techniques. It is understood that all doping may be reversed accordingly such as providing an N-type silicon substrate having an epilayer with a P-type light-sensing region.

The substrate 110 may also comprise lateral isolation features (not shown) such as shallow trench isolation (STI) features to separate the pixels and/or other devices formed on the substrate. These other devices may include various doped regions each having an N-type or P-type, such as an N-well or P-well. Even though the present example describes a photodiode, it is understood that other types of pixels may be used. Other types of pixels include, but are not limited to, pinned photodiodes, photo transistors (e.g., p/n/p or n/p/n), and photogates. Additionally, configurations such as a 4T active pixel including a photodiode and four transistors (e.g., transfer gate transistor, reset transistor, source follower transistor, and select transistor) or pixel types using 4T operating concepts (e.g., sharing reset transistor and source follower transistor for several pixels) may be used for the pixels. Additional circuitry also exists to provide an appropriate functionality to handle the type of pixels 100 being used and the type of light being sensed.

The image sensor 50 includes a metal layer 120 overlying the pixels 100R, 100G, 100B. The metal layer 120 may be used for interconnecting various devices formed on the substrate 110. The metal layer 120 may comprise of conductive materials such as aluminum, aluminum alloy, copper, copper alloy, titanium, titanium nitride, tungsten, polysilion, metal silicide, and/or combinations thereof. The image sensor 50 may further include an interlayer dielectric 130 to isolate and insulate the interconnecting metal layer 120 disposed therein. The interlayer dielectric 130 may comprise of a low-k dielectric material such as a material having a dielectric constant (k) less than about 3.5. The interlayer dielectric 130 may comprise of carbon-doped silicon oxide, fluorine-doped silicon oxide, silicon nitride, silicon oxynitride, polymide, spin-on glass, amorphous fluorinated carbon, and/or other suitable materials. Even though one metal layer 120 and interlayer dielectric 130 is disclosed herein for clarity and simplicity, it is understood that multiple metal layers and interlayer dielectric are typically used in an image sensor device.

The image sensor 50 further includes a color filter layer 140 overlying the back surface 112 of the substrate 110. In the present example, the color filter layer 140 includes a first color filter 140R for filtering out red light (red filter), a second color filter 140G for filtering out green light (green filter), and a third color filter 140B for filtering out blue light (blue filter). The color filters 140R, 140G, 140B may comprise of a dye-based (or pigment-based) polymer for filtering out a specific frequency band (e.g., desired wavelength of light). Alternatively, the color filters 140R, 140G, 140B may optionally comprise of a resin or other organic-based material having color pigments.

For example, the red filter 140R may comprise of a dye-based polymer that is configured to only allow light radiation having a wavelength substantially equal to 650 nm (e.g., visible red light) to pass through to the red pixel 100R. The green filter 140G may comprise of a dye-based polymer that is configured to only allow light radiation having a wavelength substantially equal to 550 nm (e.g., visible green light) to pass through to the green pixel 100G. The blue filter 140B may comprise of a dye-based polymer that is configured to only allow light radiation having a wavelength substantially equal to 450 nm (e.g., visible blue light) to pass through to the blue pixel 100B. Accordingly, the red filter 140R is aligned with the red pixel 100R, the green filter 140G is aligned with the green pixel 100G, and the blue filter 140B is aligned with the blue pixel 100B. The color filters 140R, 140G, 140B may typically have a thickness between 5000A to 10000A.

The image sensor 50 further includes a micro-lens 150. The micro-lens 150 may be positioned in various arrangements overlying the color filters 140R, 140G, 140B and pixels 100R, 100G, 100B. It is understood that more than one micro-lens 150 may be used to focus light 160 towards the color filters 140R, 140G, 140B and pixels 100R, 100G, 100B. The micro-lens 150 may have a variety of shapes depending on the refractive index of material used for the micro-lens and the distance from the sensor surface to the micro-lens.

During operation, the back-side illuminated sensor 50 is designed to receive light 160 directed towards the back surface 112 of the semiconductor substrate 110. By doing this, the light 160 passing through to the color filters 140R, 140G, 140B and pixels 100R, 100G, 100B may be maximized since the light is not obstructed by various device features (e.g., gates electrodes) or metal features (e.g., the metal layer 120) overlying the front surface 111 of the semiconductor substrate 110. The desired wavelength of light (e.g., red, green, blue light) that is allowed to pass through to the respective pixel 100R, 100G, 100B, induces a photocurrent which may be recorded and processed.

However, there are many disadvantages in using color filters that are made from dye-based polymers. These types of materials and the techniques for processing these materials are incompatible with current semiconductor/silicon processes and thus, the color filters are typically formed only after front-end silicon processing is completed. As a result, a stack height between the color filters and substrate surface is large which can cause higher crosstalk between pixels and degrade device performance. The issue of crosstalk becomes exacerbated as the trend in pixel scaling continues with emerging technologies. Additionally, manufacturing costs are greater since a different production line specifically configured for polymer-based color filters is required. Furthermore, these polymeric materials have lower operating tolerances such as temperature variation which decreases the reliability and stability of the image sensor. Thus, what is needed is an improved and cost-effective color filter design that is compatible with semiconductor processes.

Figure 3:
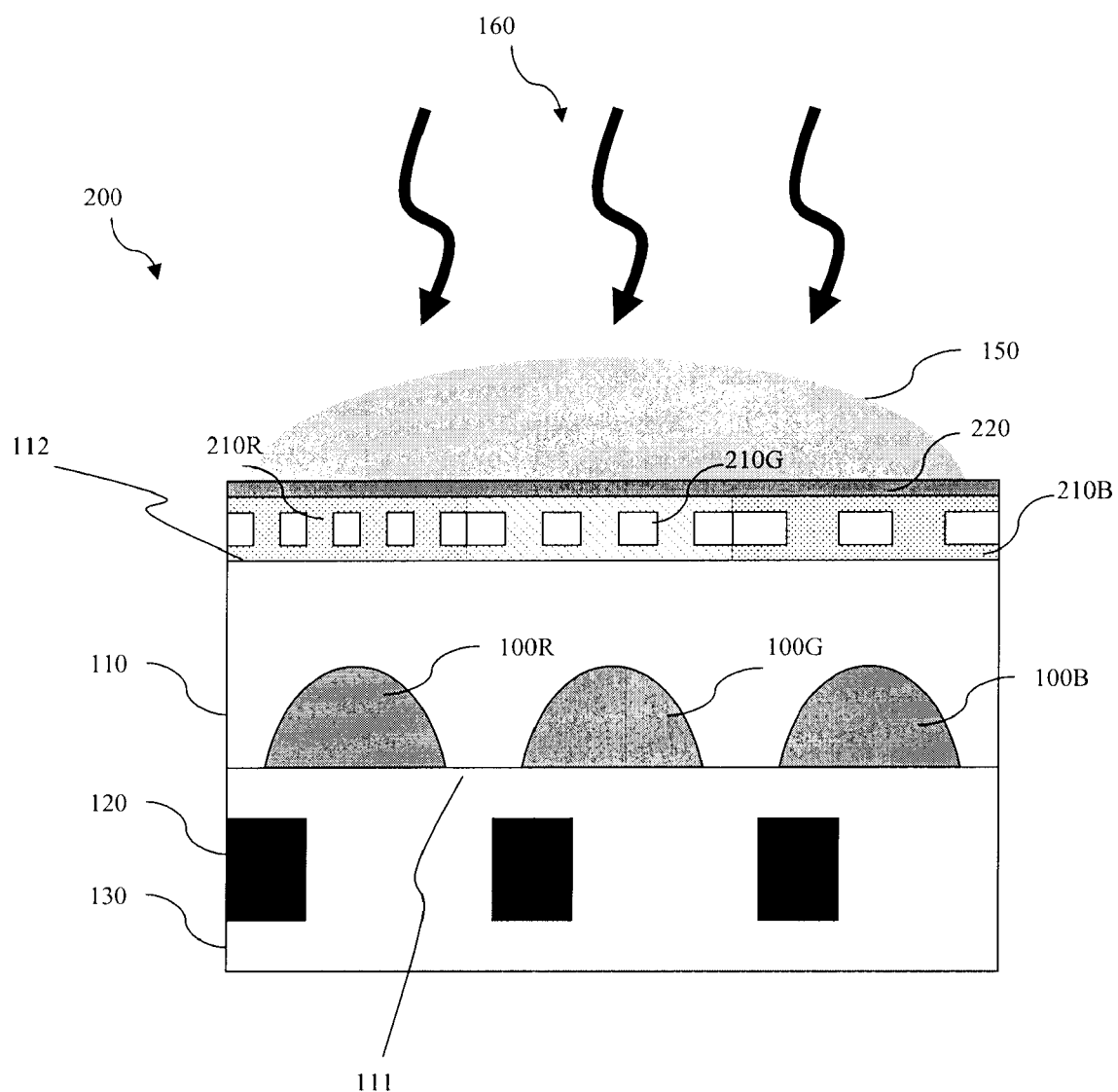
FIG. 3 is a cross-sectional view of a back-side illuminated image sensor including grid arrays according to one embodiment of the present disclosure.

Referring to FIG. 3, illustrated is cross-sectional view of a back-side illuminated image sensor 200 having a plurality of grid arrays 210. The image sensor 200 is similar to the image sensor 50 of FIG. 2 except for the features described below. Similar features in FIGS. 2 and 3 have been numbered the same for the purpose of clarity. The plurality of grid arrays 210 may include a first grid array 210R for filtering out red light, a second grid array 210G for filtering out green light, and a third grid array 210B for filtering out blue light. Accordingly, the first grid array 210R is aligned with the red pixel 100R, the second grid array 210G is aligned with the green pixel 100G, and the third grid array 210B is aligned with the blue pixel 100B.

The grid arrays 210R, 210G, 210B may be formed of an optically opaque, semi-opaque, or transparent material that is compatible with semiconductor processing. In other words, these types of materials may be formed and processed with current semiconductor processes. In one embodiment, the grid arrays 210R, 210G, 210B may be formed of a metal or metal alloy such as aluminum, aluminum alloy, copper, copper alloy, metal nitride, titanium nitride, tantalum nitride, titanium, tantalum, tungsten, or other suitable material. In another embodiment, the grid arrays 210R, 210G, 210B may be formed of a dielectric material such as silicon oxide, silicon nitride, silicon oxynitride, or other suitable material. In still another embodiment, the grid arrays 210R, 210G, 210B may be formed of polysilicon or amorphous silicon.

For the sake of example, the grid arrays 210R, 210G, 210B may be formed by physical vapor disposition (or sputtering), chemical vapor deposition (CVD), spin-on process, or other suitable process known in the art. Alternatively, the grid arrays 210R, 210G, 210B may be formed by patterning with a photoresist (photolithography) and etching with a plasma etching process. In this way, the thickness of the grid arrays 210R, 210G, 210B can be greatly reduced. For example, the grid arrays 210R, 210G, 210B may have a thickness between 50 A to 2000 A as compared to polymeric-based color filters (FIG. 2) that may have a thickness between 5000 A to 10000 A. As a result, the stack height between the grid arrays 210R, 210G, 210B and the substrate surface is also reduced. The structure and formation of the grid arrays 210R, 210G, 210B will be described in greater detail later.

The image sensor 200 may further include an anti-reflection layer 220 overlying the grid arrays 210R, 210G, 210B.

The anti-reflection layer 220 may comprise of a dielectric layer such as a silicon oxide layer and a silicon oxynitride layer. Alternatively, the anti-reflection layer 220 may also comprise of an electrical conductive layer such as titanium nitride. Other multi-layer configurations with dielectric materials and/or conductive materials available for semiconductor processes may also be used. The silicon oxide layer may have a thickness substantially equal to 350 A and the silicon oxynitride layer may have a thickness of about 400 A. The silicon oxide layer and silicon oxynitride layer may be formed by processes and techniques known in the art. The anti-reflection layer 220 may function as a first order filter that only allows radiation having a wavelength substantially between 400 nm to 700 nm (e.g., visible light spectrum) to pass through to the grid arrays 210R, 210G, 210B. It is understood that other combinations of materials may be used as optical filters depending on their refractive indices and absorption coefficients.

Figure 4:
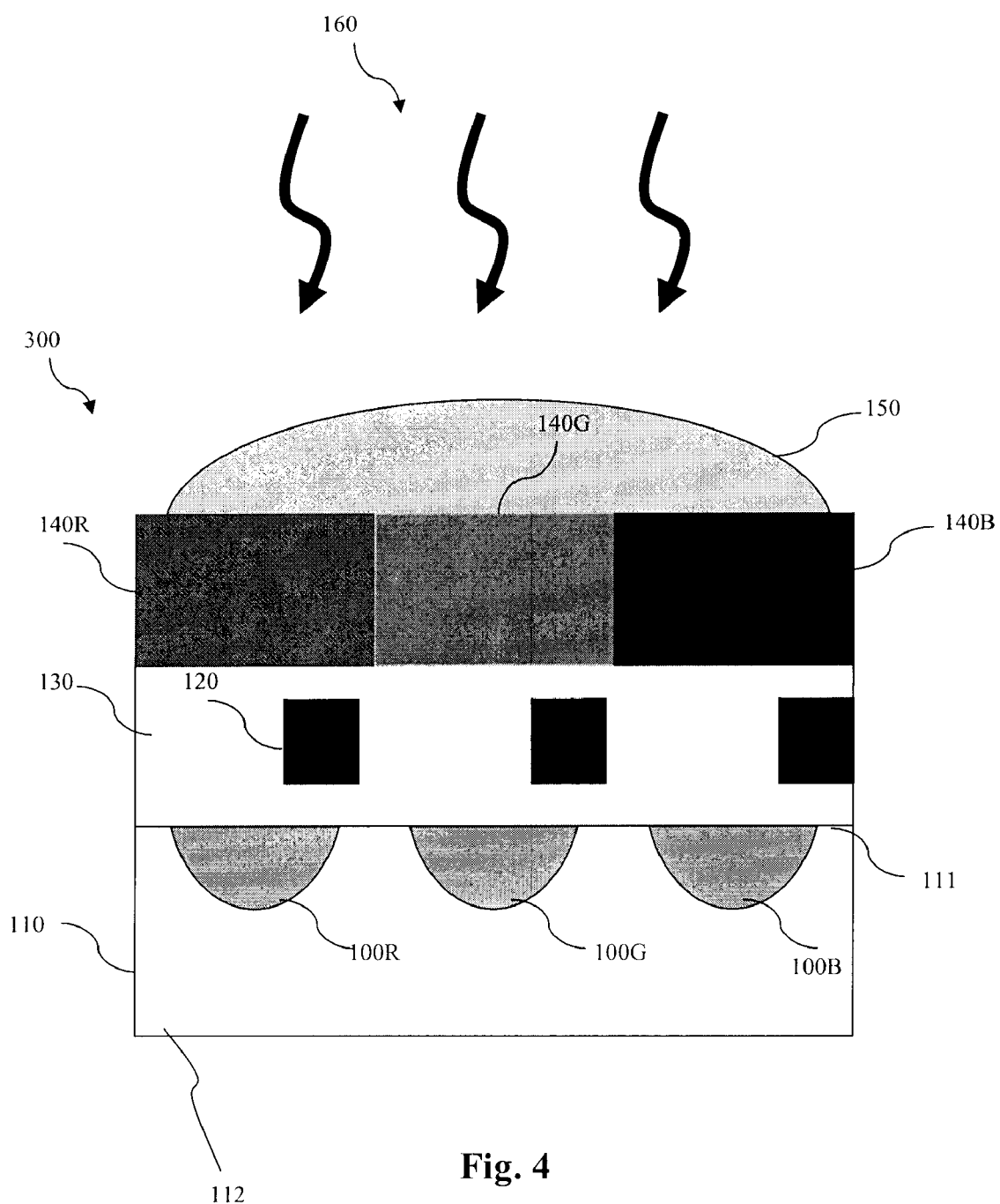
FIG. 4 is a cross-sectional view of a front-side illuminated image sensor including conventional color filters.

Referring now to FIG. 4, illustrated is a cross-sectional view of a front-side illuminated image sensor 300 having a plurality of pixels 100. The front-side illuminated image sensor 300 is similar to the back-side illuminated sensor 50 of FIG. 2 except for the location of the color filters 140R, 140G, 140B and the micro-lens 150. Similar features in FIGS. 2 and 4 have been numbered the same for the purpose of clarity. The color filters 140R, 140G, 140B may be formed overlying the front surface 111 of the semiconductor substrate 110. The micro-lens 150 may be formed overlying the color filters 140R, 140G, 140B. During operation, the image sensor 300 is designed to receive light 160 directed towards the front surface 111 of the substrate 110. As previously discussed, using color filters made of polymeric materials has many disadvantages. Additionally, because the color filters 140R, 140G, 140B are formed only after front-end silicon processing is completed, the stack height between the color filters and the substrate surface is large since the metal layer 120 and interlayer dielectric 130 lies in between. Furthermore, the light 160 directed towards the front surface 111 may be obstructed by metal features (in the metal layer 120) and other device features formed on the front surface of the substrate 110.

Figure 5:
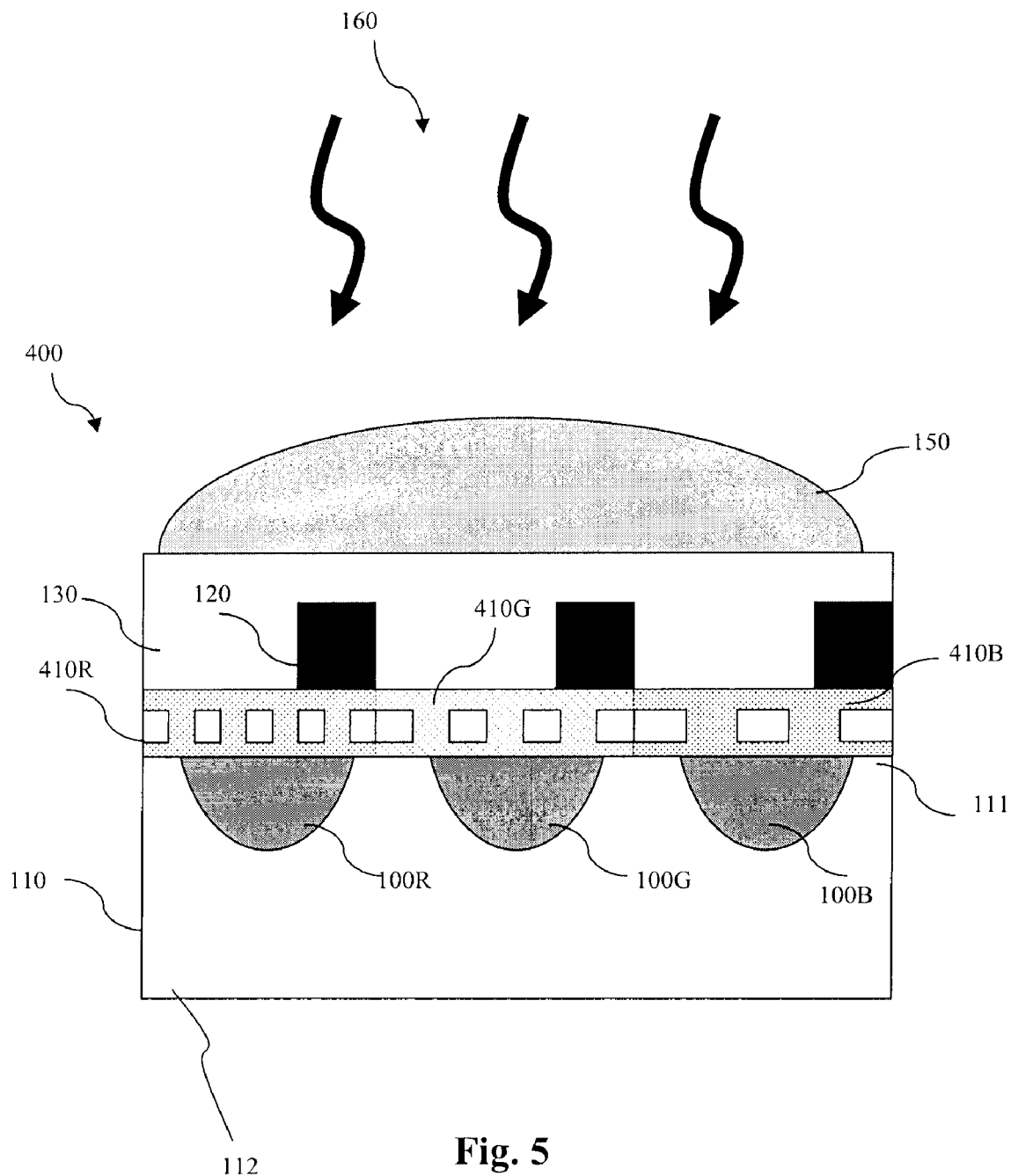
FIG. 5 is a cross-sectional view of a front-side illuminated image sensor including grid arrays according to one embodiment of the present disclosure.

Referring now to FIG. 5, illustrated is a cross-sectional view of a front-side illuminated sensor 400 having a plurality of grid arrays 410. The image sensor 400 is similar to the image sensor 300 of FIG. 4 except for the features described below. Similar features in FIGS. 4 and 5 are numbered the same for the purpose of clarity. The plurality of grid arrays 410 include a grid 410R, 410G, 410B for filtering out red, green, and blue light, respectively, as was described in FIG. 3. The grid arrays 410R, 410G, 410B are made from similar materials and formed by similar techniques as was described in FIG. 3. Since the grid arrays 410R, 410G, 410B are made from materials and formed by techniques that are compatible with semiconductor processing, the grid arrays may be formed overlying the front surface 111 of the semiconductor substrate 110 before forming the metal layer 120 and interlayer dielectric 130. This greatly reduces the stack height between the grid arrays 410R, 410G, 410B and the front surface 111 of the substrate 110. Alternatively, the grid arrays 410R, 410G, 410B may be integrated with the metal layer 120 and interlayer dielectric 130. The image sensor 400 may further include an anti-reflection layer (not shown) as was also described in FIG. 3.

Figure 6:
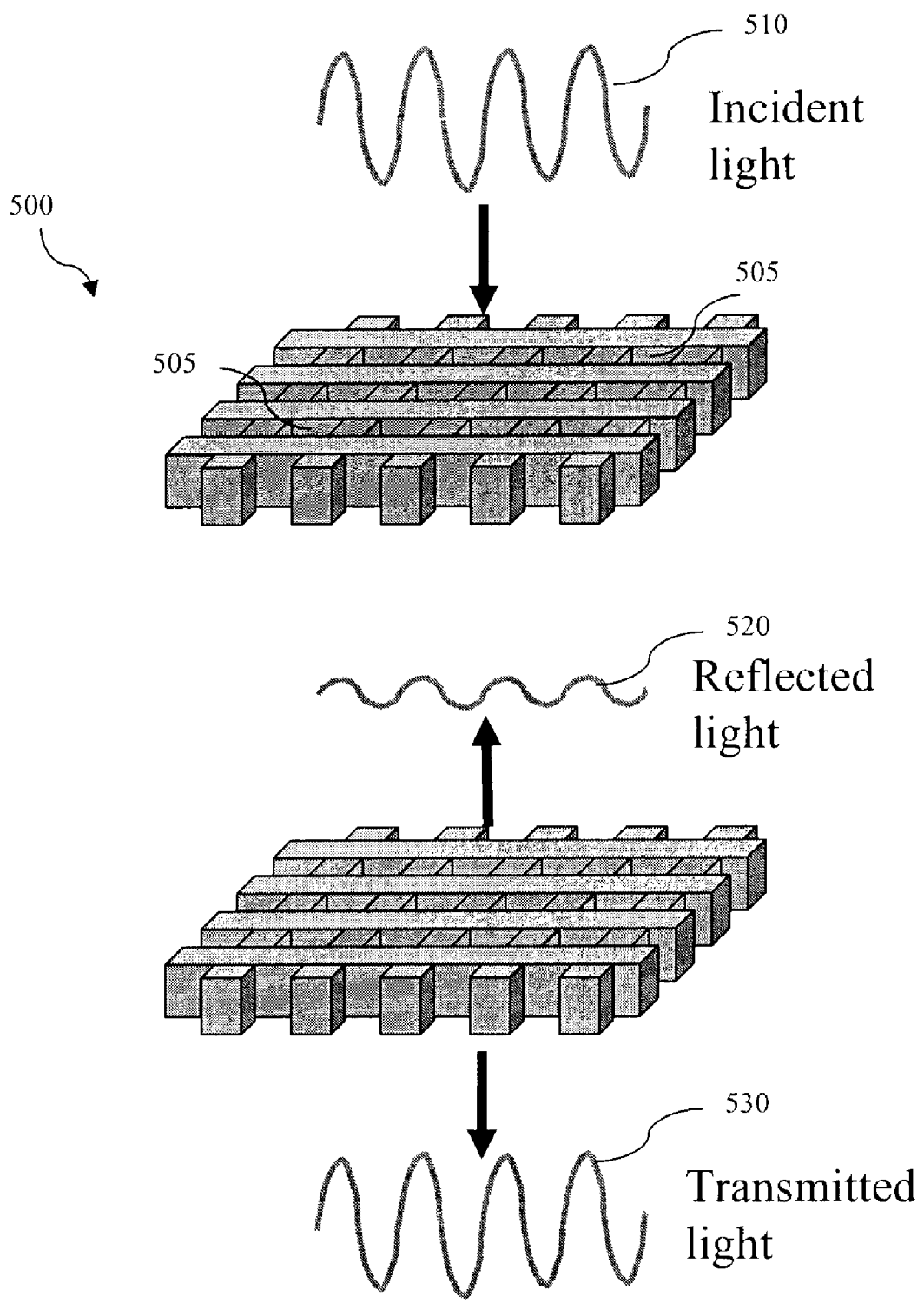
FIGS. 6 and 7 are perspective views of a grid array that may be used in the image sensors of FIGS. 3 and 5.
Figure 7:
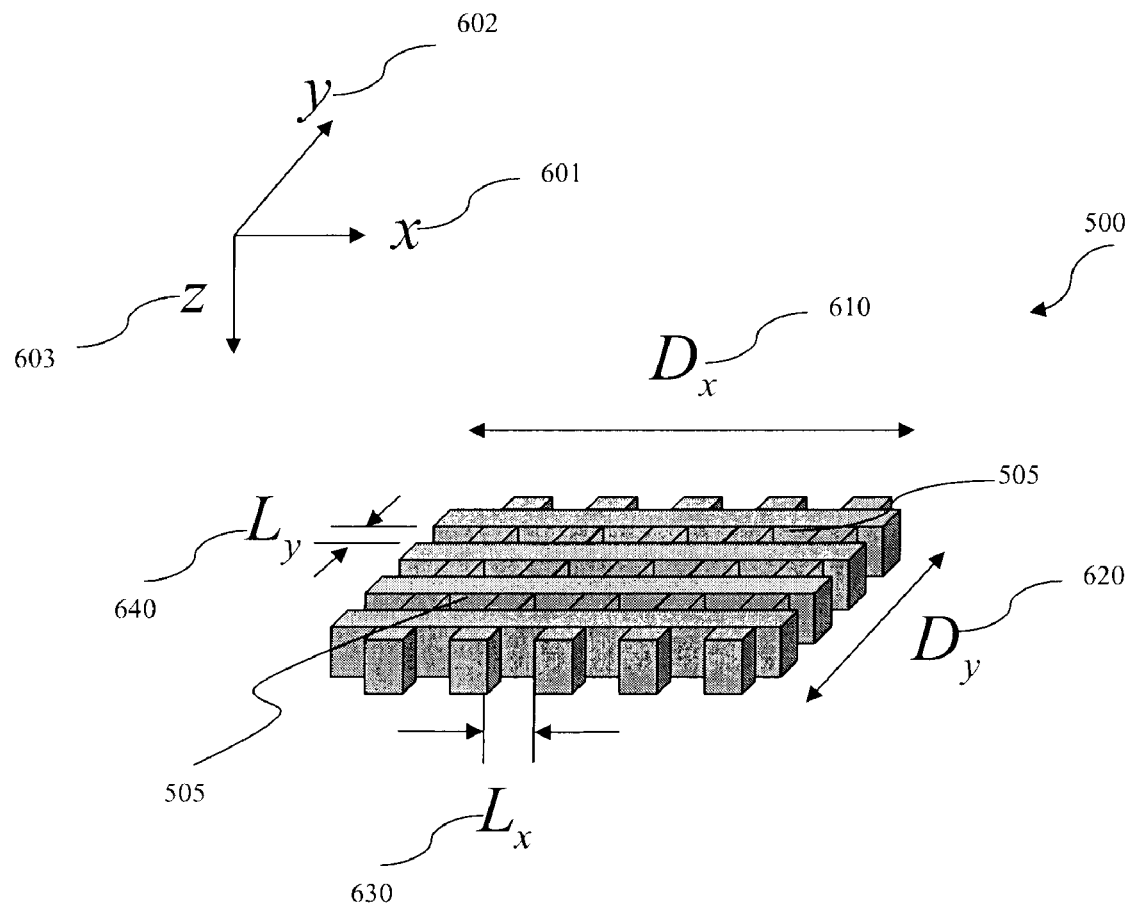

Referring now to FIGS. 6 and 7, illustrated are perspective views of a grid array 500 that may be used with the image sensors 200, 400 of FIGS. 3 and 5. In FIG. 6, the grid array 500 may include at least one opening 505 for allowing a specific frequency band of light to pass through. The opening 505 may have a square shape. Alternatively, the opening 505 may optionally have other shapes such as circular, elliptical, or rectangular. As incident light 510 is directed towards the grid array 500, the light 520 with a wavelength that is not within the specific frequency band may be reflected by the grid array. The light 530 with a wavelength that is within the specific frequency band may be transmitted and passes through the grid array 500. The configuration of the grid array 500 and the size and shape of the opening 505 determines the specific frequency band.

In FIG. 7, the grid array 500 may be defined in an X-axis 601, Y-axis 602, and Z-axis 603. As previously discussed, the grid array 500 may have a thickness between 50 A to 2000 A defined along the Z-axis 603. The grid array 500 may further include a width ($D_x$) 610 defined along the X-axis 601 and a length ($D_y$) 620 defined along the Y-axis 602. The dimensions of width 610 and the length 620 of the grid array 500 will depend on the dimensions of the pixel. The grid array 500 may be configured to substantially cover one entire pixel. For example, for a technology node of 0.18 μm, a width and length of a pixel may be about 3 μm with an area of about 9 μm². Accordingly, the grid array 500 will have a width 610 and length 620 substantially equal to 3 μm with an area of about 9 μm The opening 505 in the grid array 500 has a width ($L_x$) 630 defined along the X-axis 601 and a length ($L_y$) 640 defined along the Y-axis 602. In the present embodiment, the opening 505 has a square shape and thus, the width ($L_x$) 630 is substantially equal to the length ($L_y$) 640. As previously discussed, the size and shape of the opening 505 may determine the specific frequency band of light that is allowed to pass through the grid array 500. In the present embodiment, for the grid array 500, an electromagnetic wave boundary condition may specify that maximum transmission occurs when the width ($L_x$) 630 and length ($L_y$) 640 is substantially equal to one-half of the wavelength (λ) of the transmitted light (e.g., $L_x=L_y=\lambda/2$). Accordingly, for transmitting red light having a wavelength equal to about 650 nm, the width ($L_x$) 630 and length ($L_y$) 640 of the opening 505 is substantially equal to 325 nm. For transmitting green light having a wavelength equal to about 550 nm, the width ($L_x$) 630 and length ($L_y$) 640 of the opening 505 is substantially equal to 275 nm. For transmitting blue light having a wavelength equal to about 450 nm, the width ($L_x$) 630 and length ($L_y$) 640 of the opening 505 is substantially equal to 225 nm. It is understood that grid arrays having other types of configurations may have different boundary conditions that dictate the size and shape of the openings.

Thus, provided is an improved image sensor device and method for making the same. In one embodiment, an image sensor device includes a semiconductor substrate having a front surface and a back surface, a plurality of pixels formed on the front surface of the semiconductor substrate, and a plurality of grid arrays aligned with one of the plurality of pixels. One of the grid arrays is configured to allow a wavelength of light to pass through to the corresponding one of the plurality of pixels. In some embodiments, the wavelength of light is red light. In other embodiments, the wavelength of light is green light. In still other embodiments, the wavelength of light is blue light. In some embodiments, each grid array includes at least one opening. The opening having a width that is substantially equal to one-half the wavelength of light.

In some embodiments, the plurality of grid arrays is disposed overlying the front surface of the semiconductor substrate. In other embodiments, the plurality of grid arrays is disposed overlying the back surface of the semiconductor substrate. In other embodiments, the plurality of grid arrays have a thickness between 50 A to 2000 A. In some embodiments, the plurality of grid arrays are formed of polysilicon. In other embodiments, the grid arrays are formed of amorphous silicon. In other embodiments, the grid arrays are formed of silicon nitride. In other embodiments, the grid arrays are formed of silicon oxide. In still other embodiments, the grid arrays are formed of silicon oxynitride. In other embodiments, the grid arrays are formed of metal, metal nitride, or metal alloy.

In some embodiments, the plurality of pixels are photodiodes. In other embodiments, the pixels are pinned photodiodes. In other embodiments, the pixels are photo transistors. In other embodiments, the pixels are photogates. In other embodiments, the pixels are reset transistors. In other embodiments, the pixels are source follower transistors. In still other embodiments, the pixels are transfer gate transistors. In some embodiments, the image sensor device further includes an anti-reflection layer. The anti-reflection layer comprises a silicon oxide layer and a silicon oxynitride layer. In some other embodiments, the image sensor device further included a metal layer overlying the plurality of pixels, an interlayer dielectric for the metal layer, and a micro-lens overlying the plurality of grid arrays.

Also provided is one embodiment of a method for making an image sensor device. The method includes providing a semiconductor substrate having a front surface and a back surface, forming a plurality of pixels on the front surface of the semiconductor substrate, and forming a plurality of grid arrays aligned with one of the plurality of pixels. One of the grid arrays is configured to allow a wavelength of light to pass through to the corresponding one of the plurality of pixels. In some embodiments, the forming the plurality of grid arrays includes patterning and etching at least one opening in each of the grid arrays. In other embodiments, the forming the plurality of grid arrays includes disposing the grid arrays overlying the front surface of the semiconductor substrate. In still other embodiments, the forming the plurality of grid arrays includes disposing the grid arrays overlying the back surface of the semiconductor substrate. In other embodiments, the method further includes forming a metal layer overlying the plurality of pixels, forming an interlayer dielectric for the metal layer, and forming a micro-lens overlying the plurality of grid arrays.

Also provided is one embodiment of a semiconductor device comprising a semiconductor substrate having a front surface and a back surface, a plurality of pixels on the front surface of the semiconductor substrate, and a plurality of grid arrays. One of the grid arrays is aligned with at least one of the pixels such that a wavelength of light is allowed to reach the at least one of the plurality of pixels. In some embodiments, the wavelength of light is red light. In other embodiments, the wavelength of light is green light. In still other embodiments, the wavelength of light is blue light. In other embodiments, the plurality of grid arrays are located overlying the front surface of the semiconductor substrate. In some other embodiments, the plurality of grid arrays are located overlying the back surface of the semiconductor substrate. In still other embodiments, the one of the grid arrays includes at least one opening having a width equal to one-half of the wavelength of red light. In other embodiments, the one of the grid arrays includes at least one opening having a width equal to one-half of the wavelength of green light. In other embodiments, the one of the grid arrays includes at least one opening having a width equal to one-half of the wavelength of blue light.

Also provided is another embodiment of an image sensor device. The image sensor device includes a semiconductor substrate, a first, second, and third pixel formed on the semiconductor substrate, and a first, second, and third gird aligned with the first, second, and third pixel, respectively. The first, second, and third grid include at least one opening to allow a desired wavelength of light to reach the first, second, and third pixel, respectively. In some embodiments, the desired wavelength of light is red light. In other embodiments, the desired wavelength of light is green light. In still other embodiments, the desired wavelength of light is blue light. In some embodiments, the at least one opening is substantially square having a width equal to one-half the desired wavelength of light. In other embodiments, the first, second, and third grid have a thickness between 50 A to 2000 A.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. For example, the color filters disclosed may be configured to filter through other colors such as cyan, yellow, and magenta, or other types of light radiation such as infrared (IR), microwave, X-ray, and ultraviolet (UV). Those skilled in the art should also realize that such equivalent constructions do not depart from the spirit and scope of the present disclosure, and that they may make various changes, substitutions and alterations herein without departing from the spirit and scope of the present disclosure.

Several different advantages exist from these and other embodiments. In addition to providing an efficient and cost-effective device and method for fabricating image sensors, the device and method disclosed herein can easily be integrated with current semiconductor processing equipment and techniques. By employing materials and processes that are compatible with current semiconductor manufacture, cost of manufacture is decreased and reliability in material performance is increased. In addition, the device and method disclosed herein significantly reduces the stack height between the color filters and the surface of the substrate. Therefore, the device and method disclosed herein can be used even as pixel size continues to shrink with emerging technologies.

What is claimed is:

1. An image sensor device, comprising:
  a semiconductor substrate having a front surface and a back surface; a plurality of pixels formed on the front surface of the semiconductor substrate;
  a plurality of grid arrays aligned with one of the plurality of pixels, each grid array having first portions in a first direction and second portions in a second direction perpendicular to the first direction;
  wherein one of the plurality of grid arrays is configured to allow only a selected waveband of light to pass through to the corresponding one of the plurality of pixels, wherein the selected waveband of light is of a type selected from the group consisting of: red light, green light, and blue light, wherein the one of the plurality of grid arrays includes at least one opening defined by the first and second portions, wherein the at least one opening has a width that is equal to one-half of a wavelength of light within the selected waveband so that maximum transmission occurs with respect to the selected waveband.

2. The device of claim 1, wherein the plurality of grid arrays are disposed overlying the front surface of the semiconductor substrate.

3. The device of claim 1,
wherein the plurality of grid arrays are disposed overlying the back surface of the semiconductor substrate; and
including interconnects overlaying the front surface of the semiconductor substrate.

4. The device of claim 1, wherein the plurality of grid arrays have a thickness between 50 A to 2000 A.

5. The device of claim 1, wherein the plurality of grid arrays are formed of a material selected from a group consisting of: polysilicon, amorphous silicon, silicon nitride, silicon oxide, silicon oxynitride and combinations thereof.

6. The device of claim 1, wherein the plurality of grid arrays are formed of a metal, metal nitride, or metal alloy.

7. The device of claim 1, wherein the plurality of pixels are selected from a group consisting of: photodiodes, pinned photodiodes, photo transistors, photogates, reset transistors, source follower transistors, transfer gate transistors, select transistors, and combinations thereof.

8. The device of claim 1, further comprising an anti-reflection layer overlying the plurality of grid arrays, wherein the anti-reflection layer includes a silicon oxide layer and a silicon oxynitride layer.

9. The device of claim 1, further comprising:
a metal layer overlying the plurality of pixels;
an interlayer dielectric for the metal layer; and
a micro-lens overlying the plurality of grid arrays.

10. A semiconductor device, comprising:
a semiconductor substrate having a front surface and a back surface;
a plurality of pixels formed on the front surface of the semiconductor substrate; and
a plurality of grid arrays formed over the back surface of the semiconductor substrate, wherein one of the plurality of grid arrays is aligned with at least one of the plurality of pixels such that only a selected waveband of light is allowed to reach to the at least one of the plurality of pixels, wherein the one of the plurality of grid arrays is formed of a non-metal material and includes at least one opening having a width equal to one-half of a wavelength of light within the selected waveband, and wherein the selected waveband of lights is of a type selected from a group consisting of: red light, green light, and blue light; and
a metal interconnect layer formed over the front surface of the semiconductor substrate.

11. The device of claim 10,
wherein the plurality of grid arrays are located overlying the back surface of the semiconductor substrate; and
including interconnects overlaying the front surface of the semiconductor substrate.

12. The device of claim 10, wherein the plurality of grid arrays are located overlying the front surface of the semiconductor substrate.

13. The device of claim 10, wherein the one of the plurality of grid arrays is formed of a material selected from the group consisting of: polysilicon, amorphous silicon, silicon nitride, silicon oxide, and silicon oxynitride.

14. An image sensor device, comprising:
a semiconductor substrate;
a first, second, and third pixel formed on the semiconductor substrate;
a first filter layer including a first, second, and third grid aligned with the first, second, and third pixel, respectively; and
a second filter layer formed on the first filter layer, the second filter layer allowing only light in a visible spectrum to reach the first filter layer while filtering out light outside the visible spectrum;
wherein the first grid includes at least one opening to allow only a first waveband of the visible light to reach the first pixel, the second grid includes at least one opening to allow only a second waveband of the visible light different from the first waveband to reach the second pixel, and the third grid includes at least one opening to allow only a third waveband of the visible light different from the first and second wavebands to reach the third pixel wherein the at least one opening is a square having a width equal to one-half of a wavelength within one of the first, second and third wavebands of light, and wherein the first, second, and third wavebands of light a respectively red light, green light and blue light.

15. The device of claim 14, wherein the first, second, and third grid have a thickness between 50 A and 2000 A.

16. The device of claim 14, wherein the second filter layer includes a silicon oxide layer and a silicon oxynitride layer.

* * * * *